United States Patent Office.

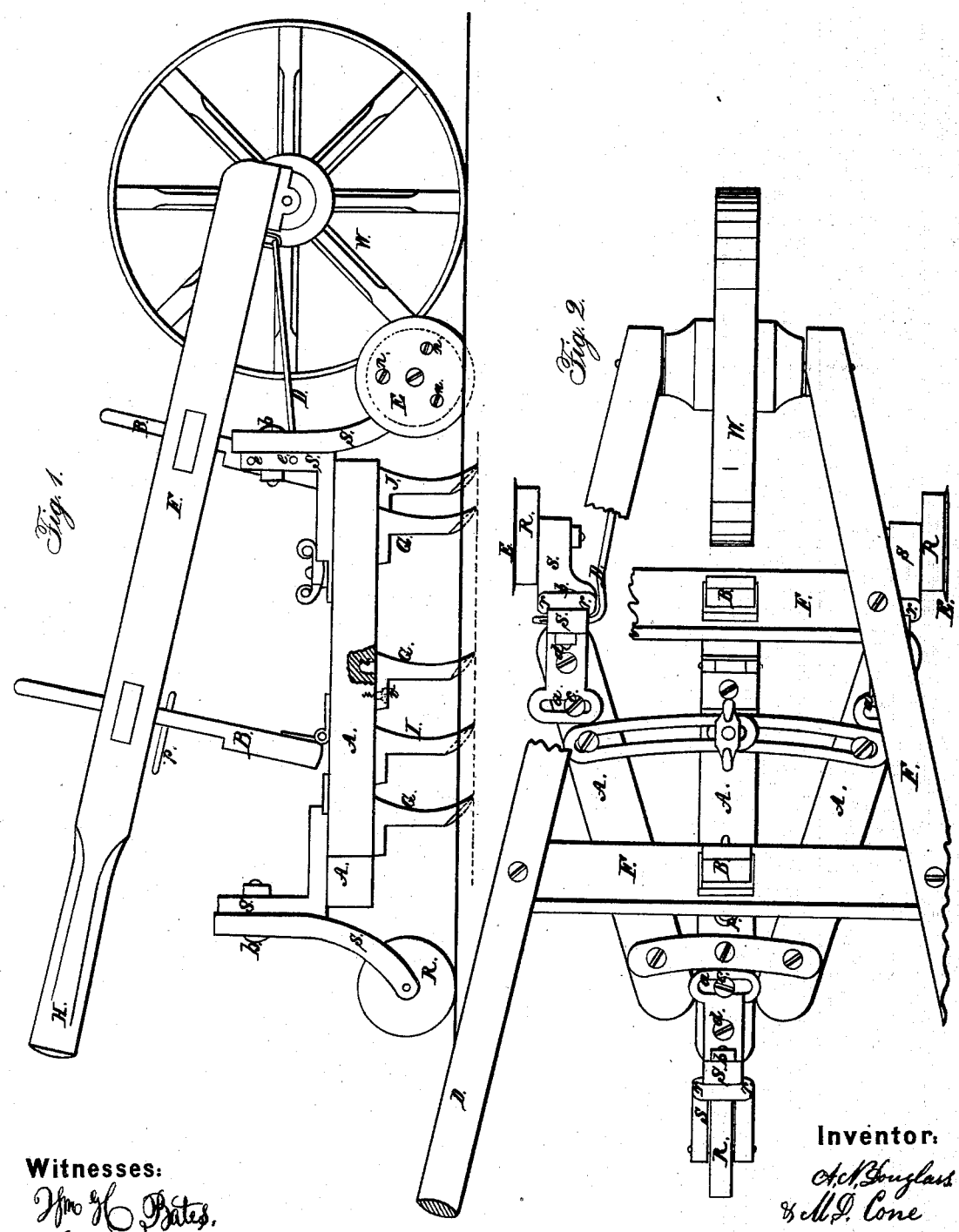

M. D. CONE AND A. N. DOUGLASS, OF PORT GIBSON, NEW YORK.

*Letters Patent No. 62,817, dated February 26, 1867.*

IMPROVEMENT IN GARDEN OR HAND CULTIVATORS.

*The Schedule referred to in these Letters Patent and making part of the same.*

TO ALL WHOM IT MAY CONCERN:

Be it known that we, M. D. CONE and A. M. DOUGLASS, of Port Gibson, in the county of Ontario, and State of New York, have invented certain new and useful "Improvements in Garden or Hand Cultivators;" and we do hereby declare that the following is a full, clear, and exact description thereof, reference being had to the accompanying drawings, making part of this specification, in which—

Figure 1 is a side elevation of our invention.

Figure 2 is a plan or top view of the same, a portion of the truck frame on one side being broken away to show the relative arrangement of the coulter-wheels, guide-stocks, and draught-rods, and the manner of connecting them.

This invention consists mainly in suspending the cultivator frame to a wheeled truck in such a manner as to be drawn by it, the truck being propelled by the attendant; and in pivoting hanger-stocks of the vertically adjustable rollers so that the axis of the two front rollers may be kept at right angles with the line of travel, whether the frame is spread or contracted; also, in providing detachable circular cutter-blades to the two front or side rollers, for the purpose of trimming strawberry vines while weeding them.

To enable others to make and use our invention, we will describe its construction and operation.

We construct the frame A similar to the ordinary adjustable winged cultivator frames, and provide it with three carrier-wheels or rollers, R. The shanks $s$ of these rollers are slotted at the upper end to receive the clamping-bolt $b$, so as to permit the rollers to be raised or lowered. These shanks may be provided on each side with a rib, $r$, to clasp the upright arm of the hanger-stocks S, and thereby prevent them from turning upon the bolt. The stocks S are pivoted to the frame by the clamping bolts $d$. The end of the bed-plate of each of the stocks is provided with a suitable slot, $a$, to receive the set screw $c$, as seen in fig. 1. By means of this adjustability, when the frame is spread, as shown in the drawing, or more or less contracted, the said rollers may be set exactly in line with the travel of the machine. Or, if the machine was to be used along a hill-side, it might be found desirable to set the rear or centre roller so as to tend to run up the hill, and thereby relieve the arms of the operator from the lateral strain caused by the otherwise natural tendency of the machine to work down hill. The two front or side rollers may be provided with an annular or a disk coulter-blade, E, having a sharp edge. These may be attached to the rollers by means of screws $n$. They are intended more especially for trimming strawberry vines; at other times they may be removed. The draught-rods D are hinged to the wheeled truck or hand frame F, as seen in fig. 1, and to the stocks S, as shown in both figures. The steadying or guide-bars B are hinged to the centre bar of the frame A. The axis of the hinge is arranged transversely to the frame, which renders the guide-bars rigid in that direction, but permits a free movement the other way. These guides B pass loosely through the vertical mortises in the cross-bars of the truck frame. By this means the handles H may rise or fall as the machine is propelled, and at the same time the cultivator is effectually guided laterally. When the implement is to be taken to or from the field, or from one field to another, the pin $p$ is withdrawn and the handles dropped down, so as to bring the pin, when replaced, above the frame, thus causing the cultivator to be raised with the handles, and the whole is then carried upon the wheel W. There may be several holes in the front stocks S, to receive the draught-rods D, as shown at $e$, in fig. 1, whereby the draught may be made to tend upward or downward upon the cultivator, as may be desired. The main object in reversing the position of the cultivator frame is, that those points coming nearest the hills or rows may be farthest in advance of the attendant. By contracting the wings sufficiently this cultivator may be used for hoeing or cultivating carrots, beets, or other vegetables, &c., usually sowed in drills. The teeth G, I, and J, may be made of any desired form, size, or material, and any desired number may also be used. If there should be two teeth, I and J, placed on the centre beam or bar, they should be arranged more or less out of line with each other. Each tooth is provided with a pivot or dowel, $i$, which, when the clamping-bolt $v$ is screwed up, prevents the teeth from turning, and by having both the dowel and the bolt holes bored through, the teeth may be reversed at any time if the cultivator is to be reversed. It would probably be preferable to have the clamping-bolt where the dowel is shown, and the dowel on the plate where the bolt now is. By using the wheeled truck or barrow, from which to drive the cultivator, the latter is entirely relieved from the varying and downward pressure of the attendant, thus proportionably relieving the labor necessary to drive it.

What we claim as our invention, and desire to secure by Letters Patent, is—

1. Suspending the cultivator frame from a wheeled truck or barrow, by which it is drawn, substantially in the manner and for the purposes herein shown and described.

2. The jointed or hinged draught-rods or their equivalents, and the cultivator frame, either with or without the guide-bars B, in combination with the wheeled truck, substantially as and for the purposes set forth.

3. Providing the pivoted arm of the wheel-stock S with a slot, $a$, as shown, and for the purposes set forth.

4. The arrangement of the revolving coulter-wheels, and their vertically adjustable hangers, upon the pivoted or adjustable stock S.

M. D. CONE,
A. N. DOUGLASS.

Witnesses:
    JOHN L. BURLEIGH,
    MARY BURLEIGH.